United States Patent Office 3,276,339
Patented Oct. 4, 1966

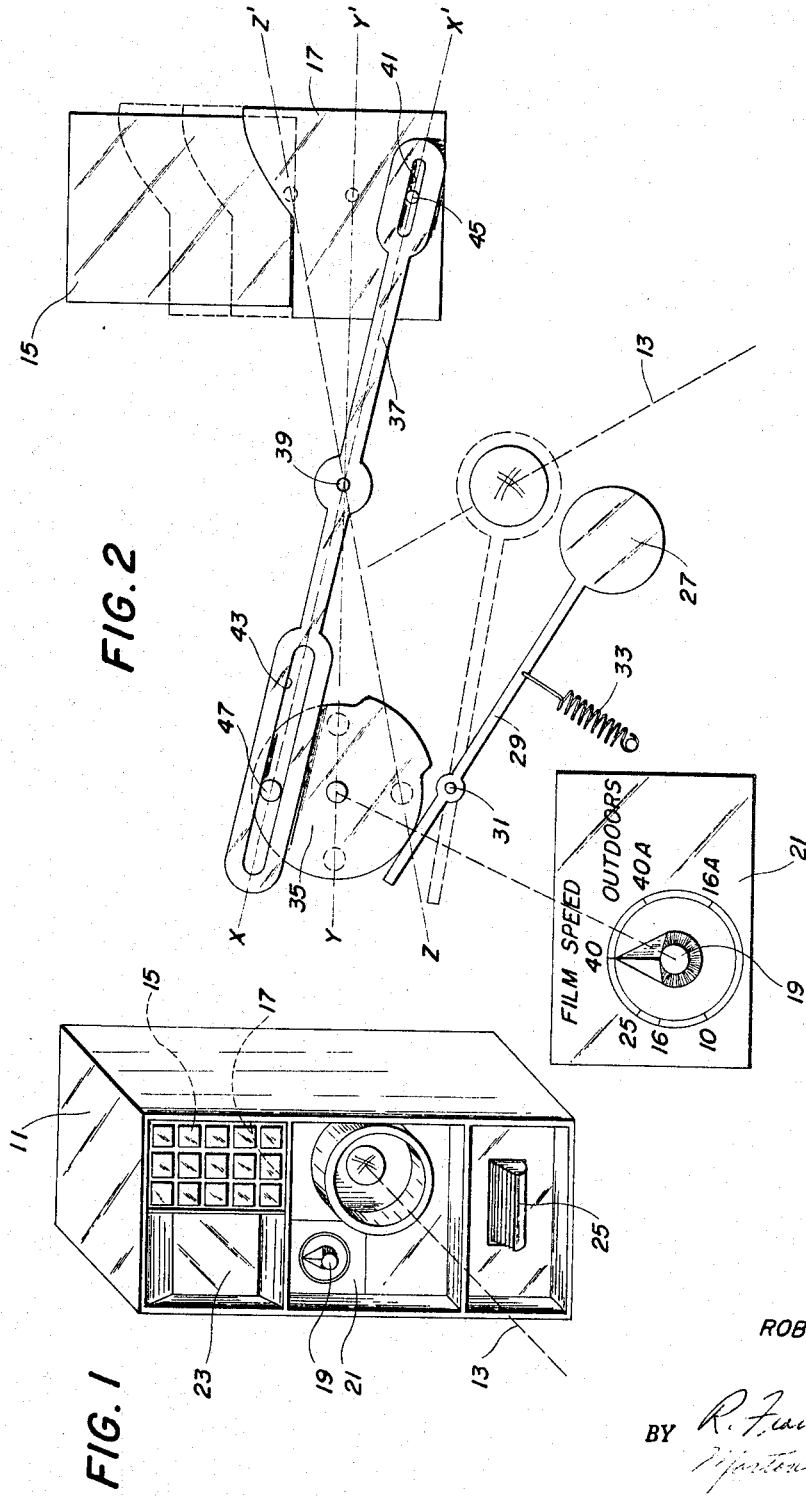

3,276,339
FILTER COMPENSATION FOR AUTOMATIC
EXPOSURE CONTROL SYSTEMS
Robert D. Anwyl, Rochester, N.Y., assignor to Eastman
Kodak Company, Rochester, N.Y., a corporation of
New Jersey
Continuation of application Ser. No. 211,052, July 19,
1962. This application Apr. 22, 1964, Ser. No. 361,807
5 Claims. (Cl. 95—10)

This is a continuation of application Serial No. 211,052, filed July 19, 1962, by Robert D. Anwyl, now abandoned.

This invention relates to cameras having automatic exposure control systems and, more particularly, to filter control devices for automatically altering the color composition of film-exposing light in accordance with the type of film in the camera as well as adjusting the camera's exposure control system to compensate for the speed of the film being exposed and for the light loss caused by the introduction of any color-balancing filter into the camera's picture-taking light path.

It has been common practice for some years to embody in motion picture cameras a filter to balance the light received by the camera so that indoor compensated color films can be used for making movies in daylight. In these prior art devices, manual operation of a lever or slide permits the placement of the filter in or out of the camera's picture-taking axis. At the same time, many well-known devices have been developed in the prior art to automatically control the exposure of cameras, and most of these devices utilize a photocell or other photo-responsive device which operates a galvanometer coil which in turn controls the size of the camera's aperture and/or the shutter speed. In movie cameras these automatic devices are generally calibrated in accordance with various film speeds, slower speed films requiring more light to photograph a given scene than that required by higher speed films. When filters such as those described above have been employed with these automatic exposure control cameras, not only has it been necessary for the camera operator to be knowledgeable as to the particular conditions requiring the use of a color-balancing filter, but is has also been necessary that the operator remember a second "filter" film speed for each particular film being used, since the insertion of the filter cuts out a percentage of the available light and thereby effectively reduces the film speed. Thus, the operator has been expected to recognize the need for insertion of a filter and, in the event a filter was required, to interpret a "filter factor" for reducing the setting of the automatic exposure control device to a lower film speed.

Prior art devices are known in which the camera's exposure control system is automatically compensated for filters selectively introduced by the camera operator. While these devices relieve the operator of the burden of calculating a "filter factor" for a particular selected filter, the operator must still be knowledgeable enough to select the proper required filter. The subject invention is an improvement on these prior art cameras further simplifying camera operation by providing for the automatic introduction of a color-balancing filter when such is required and compensating the camera's exposure control system for the introduction of the filter, the camera operator being merely required to set an indicator knob in accordance with the speed and type of film being exposed and the lighting conditons under which he is going to expose the film (i.e., artificial light or daylight).

According to the preferred embodiment of the invention disclosed herein, the introduction of the filter is accomplished by a cam-driven lever that is directly connected to a calibrated control mechanism of the camera's automatic exposure control system. Such calibrated controls are well known in the automatic exposure control art, and they generally are rotatable members whose setting (usually for "film speed") adjusts such devices as attenuator slides masking the system's photocell, rheostats in series with the galvanometer coil, or the starting position of the entire meter movement. When the operator desires to make photographs under conditions requiring the use of a filter (e.g., Type A "photoflood" film being used to photograph subjects illuminated by daylight), he merely turns an indicator on the camera to a preset position indicating (1) the usual identifying speed of the film being used and (2) also indicating lighting conditions under which photographs are being taken. The turning of the indicator causes the movement of the cam-controlled lever and introduces the filter into the picture-taking axis, and, at the same time, rotates the calibration control to provide the automatic exposure control system with the correct compensation for the light-absorbing effect of the filter.

It is an object of this invention to provide a device for automatically aligning a filter with the camera's picture-taking lens and for automatically adjusting the camera's automatic exposure control system.

A further object is to provide a simple means whereby the camera operator merely sets a control dial to indicate the speed and type of film being exposed as well as the lighting conditions under which the exposure is being made and thereby automatically provides for the introduction of the proper filter to correlate the color balance of the exposing light with the type of film and, at the same time, to automatically adjust the camera's automatic exposure control system to assure proper exposure of the film.

Other objects, purposes and characteristic features of the present invention will be in part obvious from the accompanying drawings, and in part pointed out as the description of the invention progresses. In describing the invention in detail reference will be made to the accompanying drawings in which like reference characters designate corresponding parts in both views, and in which:

FIG. 1 illustrates a movie camera having an automatic exposure control system and incorporating the device herein; and FIG. 2 is a partially schematic plan view of the pertinent parts of the device disclosed herein.

Although it will be apparent that the invention herein can be integrated with most automatic exposure control systems and can be applied equally to all types of cameras, the following disclosure will be limited to a description of a single application of the invention to a simple movie camera whose automatic exposure control system utilizes a masked photocell.

Referring now to FIG. 1, camera 11 is a simple movie camera having a picture-taking axis 13 on which are mounted the usual lens system and shutter mechanism, as well as the automatically controlled aperture. Exposure control on camera 11 is completely automatic and is provided by means well known in the art, namely, the control of the camera aperture in accordance with the intensity of the light in the scene being photographed, the control being provided by a galvanometer coil whose deflection is determined by the current produced by a photocell 15. To compensate the exposure control system for various exposure variables (film speed, shutter speed, etc.), photocell 15 is masked by adjustable attenuator slide 17 whose position is controlled in accordance with the setting of indicator knob 19 which, in the embodiment disclosed herein, the camera operator presets to match the film speed of the particular film being used, various film speeds being set out upon calibrated film speed scale 21. Thus, once the camera operator has set the automatic exposure system of the camera as just described, he can selectively expose the film in the camera by merely depressing film drive knob 25, and directing the camera toward scenes as represented in the viewfinder system 23, and the camera's automatic system assures correct exposure of the film.

Camera 11 is specially designed to incorporate the invention herein in a system which includes a Type 85 filter which can be manually inserted into the camera's picture-taking axis to provide the correct color balance so that the camera operator may use Type "A" photoflood color film when photographing subjects illuminated by daylight.

Referring to the simplified illustration in FIG. 2 of the camera parts pertinent to the disclosure herein, the Type 85 filter 27 is mounted on the end of filter control rod 29 which is rotatably mounted on pivot 31 and biased in a clockwise direction by spring 33. One end of rod 29 rides along the cam surface of control disk 35.

Also attached to control disk 35 is lever arm 37 which is rotatably mounted on pivot 39. Slots 41 and 43, respectively, of lever arm 37 engage pins 45 and 47 of attenuator slide 17 and control disk 35, respectively. It can be seen that the rotation of control disk 35 in either a clockwise or counterclockwise direction will cause lever arm 37 to move attenuator slide 17 to various positions overlapping or masking photocell 15.

Since indicator knob 19 is rigidly connected with control disk 35, the rotation of indicator knob 19 in a counterclockwise direction to progressively slower film speeds, will cause attenuator slide 17 to mask photocell 15 in increasing proportions, thus assuring that for any particular intensity of light, greater exposure will be provided for the slower speed films. (Such exposure control relationships are well known in the art.)

It should be obvious that as control disk 35 moves in a counterclockwise direction in response to changes in the setting of indicator knob 19 to slower film speeds, lever arm 37 moves out of alignment with line X–X′, through a position in alignment with line Y–Y′, to a position in alignment with line Z–Z′, resulting in the movement of attenuator slide 17 to various positions masking increasingly greater portions of photocell 15.

It should be noted that the counterclockwise rotation of indicator knob 19 does not cause a change in the cam surface of control disk 35 where said surface contacts the end of filter control rod 29. However, when the operator has Type A film in his camera and desires to photograph subjects in daylight conditions, he turns indicator knob 19 in a clockwise direction to the "outdoors" film speed settings. This once again causes lever arm 37 to line up with either line Y–Y′ or line Z–Z′ causing slide 17 to move into greater masking relation to photocell 15. At the same time, the raised portion of the cam surface of control disk 35 contacts the end of filter control rod 29 and moves Type 85 filter 27 against the influence of spring 33 from its position as shown to a second position in capping relation to the camera's picture-taking axis 13, as illustrated by the dotted lines in FIG. 2.

It can be seen that the mere adjustment of knob 19, in the manner just explained above, automatically inserts filter 27 and increases the masking of photocell 15. In this way, the camera is automatically conditioned to correlate the color balance of exposing light with the type of film being exposed, and, at the same time, the camera's automatic exposure control system is automatically compensated for the introduction of the color-balancing filter without requiring any calculations or the remembering of any special "filter factors" by the camera operator. All that is required by the operator in this simple system is that he turn indicator knob 19 to the dial position which indicates (1) the speed and type of the film and (2) lighting conditions under which photographs are to be made, and the invention herein automatically provides the correct color-balancing filter if required and compensates the camera's exposure system for the speed of the film and for the light-absorbing effects of the filter.

It should be understood that only one specific embodiment of the present invention has been described herein, and that the particular form disclosed has been selected to facilitate the disclosure of the invention rather than to limit the particular form which the invention may assume. Further, it should be understood that various modifications, adaptations, and alterations may be applied to the specific form shown to meet various requirements of practice without in any manner departing from the spirit or the scope of the present invention.

What is claimed is:

1. In a camera having a picture-taking axis and an automatic system for controlling exposure of film therein as a function of the output of a photo-responsive device positioned to be exposed to scene light, said system including an adjustable member movable to predetermined positions for altering the light intensity-exposure value response of said system by varying the output of said photo-responsive device, the improvement comprising: control means manually positionable in accordance with both (a) the speed and type of film in said camera and (b) the lighting conditions under which said film is to be exposed; a filter; filter control means for moving said filter from a first position out of alignment with said picture-taking axis to a second position in alignment with said axis for altering the color balance and reducing the intensity of film-exposing light passing along said axis; and means interconnecting said filter control means and said adjustable member with said control means, the positioning of said control means for preselected combinations of film speed and type and lighting conditions selectively moving said filter to said second position and moving said adjustable member to alter the response of said automatic system in accordance with the speed and type of film being exposed therein and in accordance with said reduction of intensity of film-exposing light occurring when said filter is moved to said second position.

2. The combination according to claim 1 wherein said automatic system includes a photocell and means for masking said photocell, and wherein said adjustable member alters the response of said system by varying the position of said masking means.

3. The combination according to claim 1 wherein said control means comprises a scale calibrated for combinations of film characteristics and lighting conditions, and an index member movable to a plurality of predetermined positions and adapted for cooperation with said scale.

4. The combination according to claim 3 wherein said index member is rotatable about a fixed axis and said filter control means includes a cam and lever means driven by said cam, said cam moving in fixed relation to said index member.

5. The construction according to claim 3 wherein said index member also includes second cam means, and wherein said adjustable member comprises lever means driven by said second cam means.

References Cited by the Examiner
UNITED STATES PATENTS

| | | | |
|---|---|---|---|
| 2,043,901 | 6/1936 | Mihalyi | 95—64 |
| 2,080,055 | 5/1937 | Martin | 95—10 |
| 2,186,613 | 1/1940 | Mihalyi | 95—64 |
| 2,975,693 | 3/1961 | Ort | 95—10 |
| 2,999,443 | 9/1961 | Miyauchi | 95—10 |
| 3,029,689 | 4/1962 | Cech | 95—10 |
| 3,099,194 | 7/1963 | Weiss et al. | 95—10 |

NORTON ANSHER, *Primary Examiner.*